United States Patent [19]

Hellsberg

[11] Patent Number: 4,602,151

[45] Date of Patent: Jul. 22, 1986

[54] TAG READER

[75] Inventor: Bert V. Hellsberg, Hägersten, Sweden

[73] Assignee: Erling Persson, Sweden

[21] Appl. No.: 563,551

[22] Filed: Dec. 21, 1983

Related U.S. Application Data

[63] Continuation of Ser. No. 359,392, Mar. 18, 1982, abandoned, which is a continuation-in-part of Ser. No. 222,216, Jan. 2, 1981, abandoned.

[51] Int. Cl.$^4$ ............................................. G06K 15/00
[52] U.S. Cl. .................................. 235/383; 235/385; 235/449; 235/458; 235/489; 235/493
[58] Field of Search ............... 235/458, 474, 383, 384, 235/468, 385, 449, 489, 493

[56] References Cited

U.S. PATENT DOCUMENTS

| | | | |
|---|---|---|---|
| 2,842,312 | 7/1958 | Weeks | 235/489 |
| 3,059,112 | 10/1962 | Rogal | 235/468 |
| 3,483,361 | 12/1969 | Blurton | 235/384 |
| 3,501,622 | 3/1970 | Weir | 235/384 |
| 3,548,160 | 12/1970 | Welsh | 235/375 X |
| 3,560,719 | 2/1971 | Dahl | 235/489 |
| 3,737,631 | 6/1973 | Harris | 235/383 |
| 3,754,120 | 8/1973 | Fitzgerald | 235/474 |
| 3,770,941 | 11/1973 | Gechele | 235/383 |
| 3,789,193 | 1/1974 | Bremner | 235/459 |
| 3,938,662 | 2/1976 | Ernst | 235/458 |
| 3,947,660 | 3/1976 | Saito | 235/383 |
| 4,002,886 | 1/1977 | Sundelin | 235/383 |
| 4,288,688 | 9/1981 | Kiyama | 235/475 |
| 4,348,656 | 9/1982 | Gorgone | 235/475 |
| 4,349,731 | 9/1982 | Berner | 235/458 |
| 4,357,530 | 11/1982 | Roes | 235/384 |

Primary Examiner—Harold I. Pitts
Attorney, Agent, or Firm—Pollock, Vande Sande & Priddy

[57] ABSTRACT

Tag reading for Kimball-type price tags, where a reader is fed manually with tags and prices are automatically read into a cash register. According to a preferred embodiment, the tag reader may take either hole-code tags or tags provided with printed points instead of code-holes.

7 Claims, 11 Drawing Figures

TAG READER

This application is a continuation of Ser. No. 359,392, filed Mar. 18, 1982, now abandoned, which is a continuation-in-part of Ser. No. 222,216, filed Jan. 2, 1981, now abandoned.

BACKGROUND OF THE INVENTION

This invention relates to a tag reader for coded price tags. Such tags were introduced about twentyfive years ago and are provided with machine readable codes, normally in the form of a hole code. Examples of such tags are the so-called Kimball tags. Such tags are fixed to merchandise in many retail stores, and when an object is sold, the sales-person takes away and collects the tag or a detachable piece thereof, and those liberated tags are then treated by machine in order to keep control over sales and stock. The actual processing of the collected tags is made as batch processing, and it is normal for such processing to be made at the central headquarters of a multiple chain of stores.

With present actual practice, this reading is made on big and fast machines, and such systems are popular and widely used.

At the actual sales moment, the tag serves also as a price tag, there being printed thereon a price in readable form. However, at that moment, the handling of the tags is often felt as a nuisance by the salesperson, as it has to be put on a spear or the like, to be collected in an orderly manner with other tags, to be sent later to headquarters. Thus, the tags can mean extra work at busy times when the salesperson rightly thinks that the important thing is to serve the clients as quickly as possible.

There are known various additional devices for the Kimball system. In one instance, an ordinary cash register has been provided with a collector for tags where for each sale of an object, the corresponding tag is entered and provided with extra hole codes for salesperson, actually paid price etc. However, the tags are not read and not used for automatic entering of prices into a cash register.

There are also known various readers for Kimball type tags. An example thereof is the so-called High-Speed Kimball Reader, wherein a stack of tags is entered and the tags are brought one by one in front of a row of photodetectors, which receive light through code holes where such are punched in the tags. In order to feed the tags, they are provided with two round feed holes, where radial pins of a pinwheel enter and bring the tags along a path around a circumferential portion of the rotating pinwheel. Although this machine is very rapid, it is only suitable for batch processing.

OBJECTS OF THE INVENTION

It is an object of the present invention to obtain an improved registering system building upon the well-known Kimball tag principle as described above. It is another object to eliminate the nuisance value of the collection of tags particularly at rush hours in a crowded store. A further object is to eliminate as much as possible the work of entering prices on a keyboard when articles provided with tags are sold.

A further object is to obtain a system where hole code marked tags may be used compatibly with printed code marked tags and also to use only printed codes which may be provided locally by means of simple printers instead of being delivered from a central. It is also an object to obtain a machine of the safe type which can read tags of other kinds, e.g. the code type called UPC in the USA and EAN in Europe, and which is a bar code. According to a special aspect of the invention, it is also an object to make changes in price easy in a shop where the merchandise is marked with tags, e.g. when there is a sale or promotional event.

ADVANTAGES OF THE INVENTION

From the salesperson's view, the inventive tag reader functions in the following way. When an article is to be sold to a customer, its tag or a detachable piece thereof is removed and stuck into a slot in the reader. Although there is normally a visible price indication on the tag, the salesperson does not need to read it. When the tag is stuck in, the reader reads a price code from the tag and a price signal is carried over to the cash register and registered. If several articles are to be sold to the same customer, their tags are fed in one after another, and when all the tags for a particular purchase have been fed in, the salesperson presses a buttom for the sum total, and the cash register makes the sum in a normal way and delivers a pay slip.

Sometimes, a tag may be unreadable or faulty, and the reader will then deliver that tag in a special output collector, giving off a signal which may be an audible signal or a visible signal or both. The salesperson may then try to enter the same tag again. (A tag inserted upside down will be pushed back immediately.) If it is not read then, the salesperson may read the printed information on the tag and enter the price in the cash register manually, by means of its normal keyboard. This may also be necessary for articles where the price has been reduced so that the price in the tag code is no longer valid. Such tags which are given a special treatment will normally be stored separately, whereas the tags normally read are collected inside the reader.

From the point of view of the direction of the shop, the invention presents the following advantages. The reader may deliver the information of the tags directly at the sales moment to a data register, either on-line or through a suitable medium. It is possible to provide e.g. an ordinary magnetic tape cassette for registering the data of the tags. This medium can then suitably register all the other data and not only the price, so that there may be kept track over the stock and to rapidly split up turnover e.g. in respect of product, sizes of garments etc. A distributed system is thus obtained instead of those centralized systems which have previously been used for the same purpose.

In the presently preferred embodiment, the tag reader is able to read normal tags of the so-called Kimball type and also alternatively tags where the code is not a hole code but a printed code which may be similar to the Kimball type code. In order to obtain a compatible system, the alternative tags should have guide holes which are similar to those of the old kind of tags and which are used for feeding purposes. The hole codes and the printed codes can then be read in a similar manner, and if the new kind of tags are provided with a special signal mark, it is possible to let such a mark control the manner of reading such that the salesperson need not bother to readjust the reader but can enter code tags of both kinds in any order at will. According to a special feature, the tag reader can read both holes and ink marks by means of the same equipment and entirely indiscriminately.

Normal tags of the kind previously known are usually manufactured on special machines which are quite expensive, so that it is necessary to have a centralized manufacture arranged. With my system using alternative tags which are printed, it is possible to use very simple printing machines and e.g. let the printing be governed by pre-fabricated guide holes in tag blanks.

SUMMARY OF THE INVENTION

The objects and advantages of the invention are obtained by a new type of tag reader which cooperates with a cash register. Although at present, the tag reader is envisaged as a separate item to be coupled to a cash register of the modern electronic type, which can accept electrical codes alternative to codes entered on its keyboard, such a tag reader may also be built into a cash register or other machine with a similar function. It is therefore not intended to limit the invention to the case of a separate tag reader, although this is the presently preferred embodiment.

According to the invention, there is thus provided a tag reader having an entry slot for entering tags one by one manually, one at a time in succession, a sensor for sensing the presence of a manually entered tag, means for performing an optical reading operation on machine-readable codes on a tag entered and sensed, parity checking logics providing for error readings on said tag, means for deviating a tag where a parity error is sensed, means for ejecting a deviated tag, means for recording read code information on a tag free of error readings, means for transmitting said recorded code to a cash register for entering a price therein and means for collecting recorded tags.

According to another aspect of the invention, there are provided means for manually entering a tag into a first path ending against projections on a pinwheel having two pins arranged behind the projections for manually pushing a tag against the projections and thereby activating switch means for starting rotation of said pinwheel, said two pins thereof being arranged to grip two holes in said tag for bringing it along a second, arcuate path, optical reading means adjacent said arcuate path for sensing code markings thereon, reject means for emitting a reject signal when a signal from said optical reading means is erroneous, deviating means activated by said reject signal for ejecting a bad tag, and collecting means for assembling correctly read tags.

According to a preferred embodiment, the tag reader is provided with double reading mode facilities, so that it can read an ordinary hole-code tag or a tag provided with ink markings instead of code holes. Both kinds of tags must be provided with similar feed holes, as they are mechanically treated in the same way. However, the optical reading must be made differently, although it is envisaged to use the same code positions. It is possible to use one and the same set of optical sensors in both cases, for example by sensing the lowered transmission of light at a position provided with a point of printed ink, whereas a hole is sensed by more light being transmitted through the tag. It is also possible to arrange two sets of sensors, one for sensing transmitted light from a lamp on the opposite side of the tag path, the other for sensing reflected light from a lamp on the same side of the tag path. Normally then, the first sensor set senses pulses of light, whereas the second set senses "black" pulses against the reflectivity of immaculate paper.

It is necessary to sense which kind of tag is being read. It is possible to do this by sensing the absence of a hole code by one sensor set and to activate the other sensor set in such absence, and it is then advantageous to mount the other sensor set downstream from the hole-sensing sensor set. However, it is also possible to arrange a punching or an ink-marking in a predetermined spot on the tag for indicating that a tag is of one of the kinds, and in the reader a special sensor for signalling its existence for selecting the appropriate reading mode.

It is also possible to arrange a reader for reading merely printed codes in tags, thus modifying the system by abolishing entirely the use of code holes, keeping only those holes in tags which serve purposes of location and feeding. Codes in tags may then be printed in a printing machine, using the edges of the rags as indicia for assuring that code markings fall on the right spots and not beside, thus assuring readability.

The invention may also be seen in the aspect of providing a system for accounting and registering purchases at a point of sale, comprising a cash register of electronic type which is capable of admitting electrical price code signals, and wherein there is added a tag reader, so that tags may be read and their price information automatically entered in the cash register in lieu of price information manually entered by means of the cash register's keyboard. The tags are taken from sold merchandise and entered manually one at a time, which operation serves the same purpose as the salesperson's entering of the price on the keyboard as previously made. It is possible to read other information as well from the tags for entering into a memory, store, computer or the like, exhausting all the information on the tags for treatment for all kinds of accountance purposes.

By cash register is meant a machine such as is used for adding sums of purchase, and from the standpoint of the invention, it is immaterial if it is provided with a money till or not, whether it is a unit for registering purchases in a credit card system or if the registering of purchases is made in some other way. The usefulness of the invention would not be impaired by its use with such registers, and the use of the term cash register is not implied to limit the invention to such cases where actual money cash changes hands.

DESCRIPTION OF A PREFERRED EMBODIMENT

Figure 1:
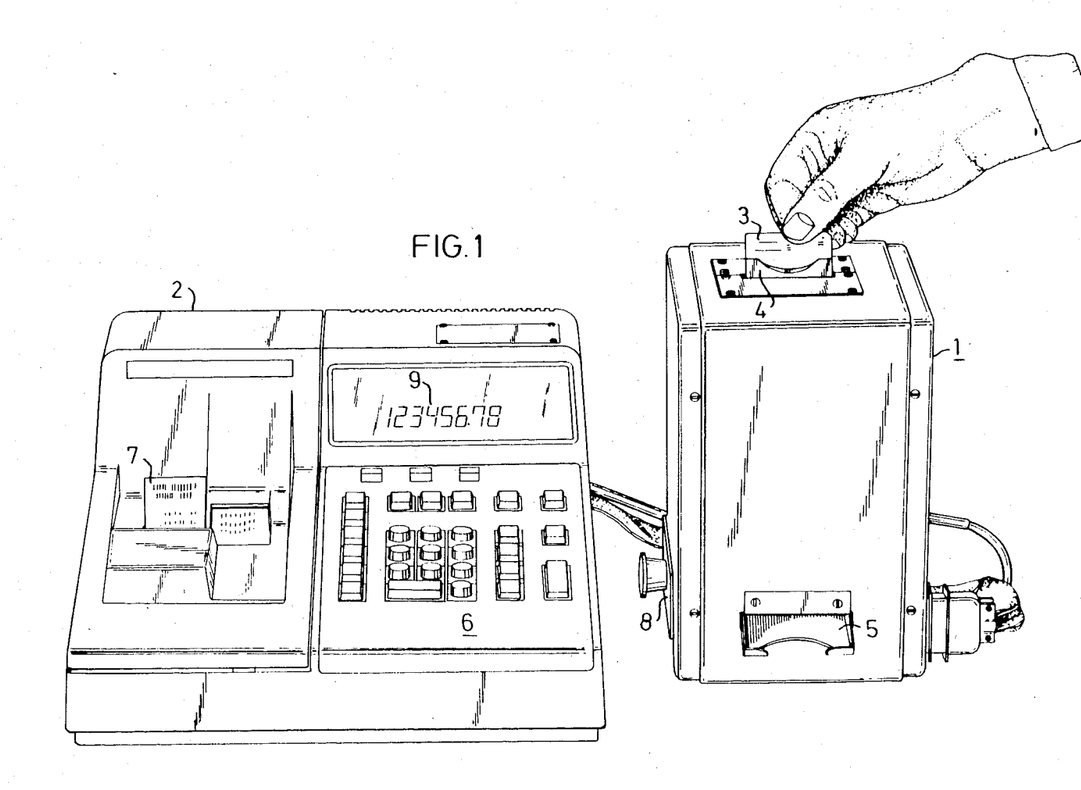
FIG. 1 shows an inventive tag reader coupled to a cash register.

In FIG. 1 is shown a tag reader 1 coupled to a cash register 2 of an electronic type (in this case a CASIO model ϵ-26ER). A tag 3 of the Kimball type is entered by hand in an entry slot 4 and pressed slightly in by hand. The reader will then start, and the tag 3 vanishes into the reader 1. As can be seen, the reader 1 is coupled to the cash register, and if the tag 3 is successfully read, the cash register will enter a price in its memory, show it on the window 9 and print it on a sales slip 7. When a number of tags have been read corresponding to a purchase, the vendor presses a sum total button on the keyboard 6, and the sum is calculated, shown in window 9 and printed on slip 7. The tags 1 read are collected in a box inside the reader, which may have the form of drawer 8. If there is an erroneous tag, it will instead be thrown out in exit 5, so that the vendor can enter the price not read (printed on the tag) by means of keyboard 6.

Figure 2:
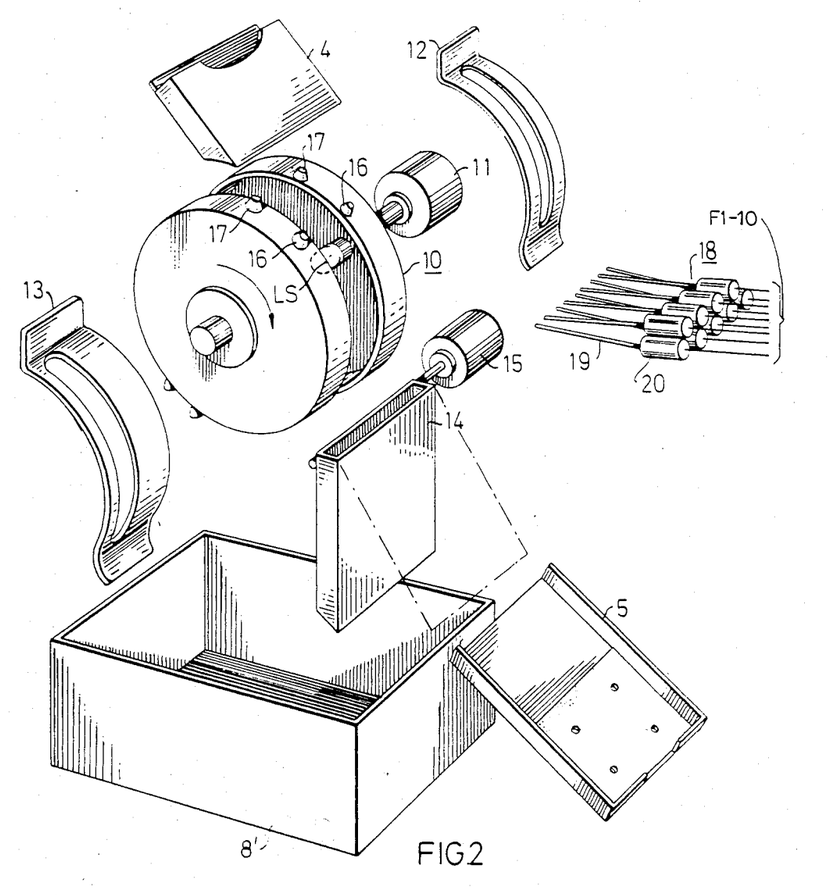
FIG. 2 shows a simplified exploded view of a tag reader.

In FIG. 2, there is shown an exploded view of a tag reader. It may be seen that under the tag entry 4, working as a slot, there is a kind of drum or pinwheel 10. Guides 12 and 13 are mounted adjacent the circumference of the wheel 10, the interspace forming a prolongation of the track defined by the tag entry 4. A tag entered will be brought against projections 16 on the drum, and means to be described below indicate electronically that a tag has been entered. This starts motor 11, which starts to rotate in the direction indicated. A pair of projections or pins 17 then grip corresponding holes in the tag and bring it along. A lamp LS inside the drum sends out light through an opening in the drum, and this light is sensed through the tag by means of a set of light sensors 18, comprised in a logic circuit for sensing codes on the tag brought in front of the sensors.

The sensors comprise optical fibers 19 coupled to light-sensitive elements 20, preferentially phototransistors. Although this is not shown, there should be, for a Kimball tag, ten such sensors directed to sense ten different positions for holes or, according to a special embodiment, printed markings which can also be sensed.

There is a feature in the logic system to be described which determines whether information read is acceptable. An accepted tag will follow a first path down into drawer 8'. There is also a bifurcator 14 which may be activated to send a misread tag into another path ending in exit 5. This bifurcator or switch (as understood in railway terms) may be activated by motor or relay 15 moving flag or guide 14. Motor or relay 14 is controlled electrically by means of logics to be explained.

Figure 3:
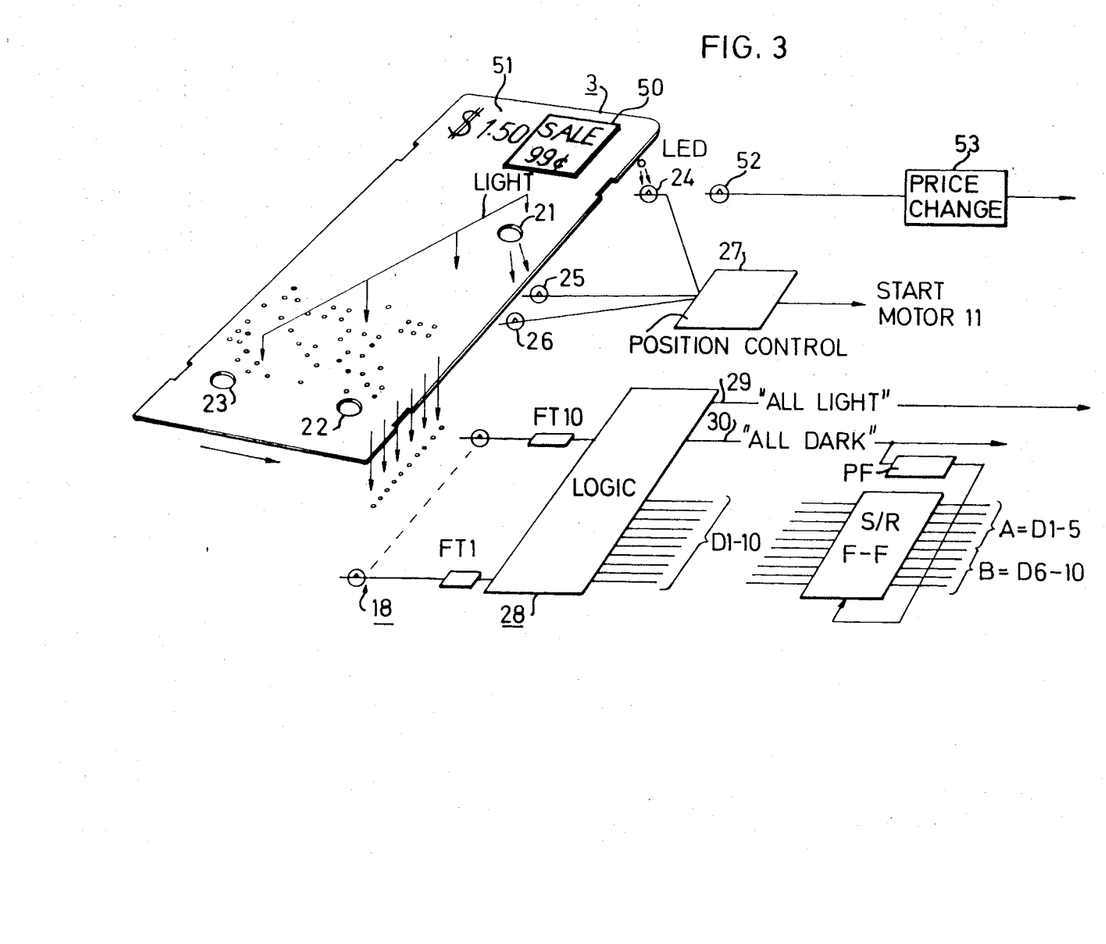
FIG. 3 is a schematic drawing explaining the electrical functions of the tag reader of FIG. 2.

In FIG. 3, there is a schematic drawing showing more in detail how a tag is read. For simplicity, the curved path is exchanged for a straight path.

A tag of one of the envisaged types is provided with holes as shown. There are feed holes 21, 22 and 23, of which holes 21 and 22 are used as explained in connection with FIG. 2.

There are further 10×12 hole positions functioning as a code pattern, there being twelve rows corresponding to 2×5 positions which ten positions are read simultaneously by the row 18 of sensors previously mentioned. It is noted that the same positions may be provided with ink dots instead of holes and that the reader may read such codes alternatively. (It should be emphasized that, although this exemplifies a very common type of coded tag, the invention is not limited to a particular card but may be used with any kind of cardlike markers provided with code markings in rows and columns.)

First, the start operation shall be explained. When a tag is inserted, its edge will break the light path between a light source and a phototransistor, which pair is schematically designed as 24. Further, there is arranged a set of at least two photosensors 25 and 26 at feed hole 21, sensing light through the hole 21 at the start position for the tag. A circuit 27 decides when sensor 24 senses a tag and sensors 25 and 26 simultaneously sense light through hole 21. The constructional features of circuit 27 do not have to be described, being well in reach for the electronic man of the art. When this combination is sensed, motor 11 is started as of FIG. 2. It is noted that this gives a control so that if the opposite edge of tag 3 is presented, there will be found no hole 21, and the apparatus will not start. (If tag is presented upside down, there will not be any hole at the position of hole 21, and there is no start either.)

The sensing of the hole 21 together with the sensing of the edge by sensor 24 is thus an important feature of the invention. According to a preferred embodiment, the motor 11 (FIG. 2) is made to start in the reverse direction if hole 21 is not detected, thus rejecting the tag by pushing it towards the fingers of the person who introduces it.

Figure 8:
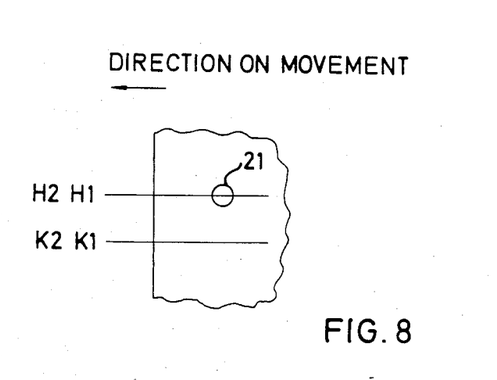
FIG. 8 is a schematic diagram showing sensor position for hole and edge sensing on a tag.
Figure 9:
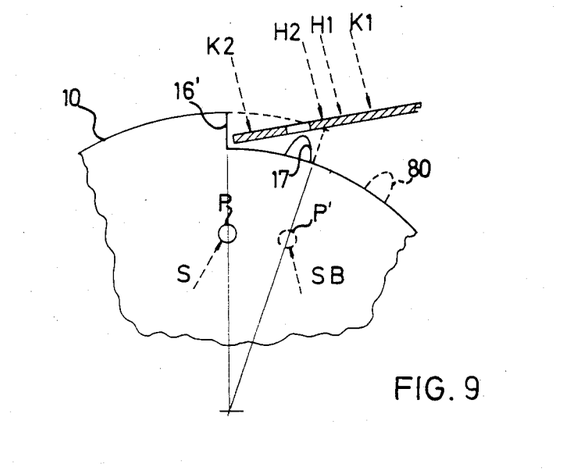
FIG. 9 is a schematic figure showing hole and edge sensing related to a pinwheel.

In a preferred embodiment, this sensing of hole 21 and edge of tag is made in a slightly more complicated way, where two optical hole sensors H1 and H2 take the place of sensor 24 in FIG. 3, which are positioned in a row in order to sense successively the hole, with two edge sensors K1 and K2, also in a row. This is schematically shown in FIG. 8. In this embodiment, the drum is also provided at one side with a hole P, and at the "home" position, this hole P falls in front of an optical sensor S, as shown in FIG. 9. At an adjacent position SB, there is another optical sensor, which senses when the drum 10 has moved backwards a certain amount.

Said optical sensors H1, H2, K1, K2, S and SB are part of a motor drive system shown in FIG. 9 for driving the motor 11. Since anyone skilled in the electronics art can understand the function of this circuit with less than a complete description of all the gates, it is sufficient to explain that the gates indicated A are OR gates (e.g. 4075), the gates indicated B are NOR gates (e.g. 4001) and the gates indicated C are AND gates (e.g. 4073). V1–V5 are "one bit memories", V1 being a hole memory, V2 "tag OK memory", V3 "Forward" and V4 "Backward". $OK_F$ and $OK_B$ are optocouplers for ordering motor 11 to turn forward and backward, respectively.

The functioning of this system will now be described step by step with particular reference to FIGS. 9 and 11, which latter shows a diagram of waveforms in the circuit of FIG. 10.

| 1. A tag is brought into the slot. | |
|---|---|
| If correct | If wrong |
| 2. Edge sensor K1 senses edge and goes low. Zeroing of memories V1, V2 and V4 is removed. | Same |
| 3. Hole sensors H1 and H2 go low, with H1 first. This sets V1, the hole memory. | Nothing |
| 4. Edge sensor K2 goes low, and V2, "tag OK", is set | K2 goes low and V4 for backward movement is set, |

| | |
|---|---|
| due to V1 being set. If S, "home", is or becomes high, and PF from central logic gives clearance signal by being low, V3 is set. | since V1 is not set. |
| 5. The tag is fed by motor 11. | The tag is brought back until hole P is brought to position P' (FIG. 8) and makes SB go high. This zeroes V4, which sets V5, the backward memory. |
| 6. When behind edge of tag leaves K1, V1, V2 and V4 are again brought to zero. | Tag is taken out manually, making K1 go high. As V5 is high, V3 is set, and drum 10 is turned forward until S goes high again and V3 is zeroed. When V3 was set, V5 was zeroed. |
| 7. When hole P is brought anew in position to make S high, the feed is complete, and V3 is zeroed. | |

The reason for sensor K2 is to assure that the tag is brought down far enough to assure that it can be gripped securely by pins 17 in holes 21,22.

It may be noted that in the embodiment of FIG. 9, projections 16 of drum 10 are exchanged for a step 16', and one pin 80 is provided for hole 23 (FIG. 3) of tag 3.

Figure 10:
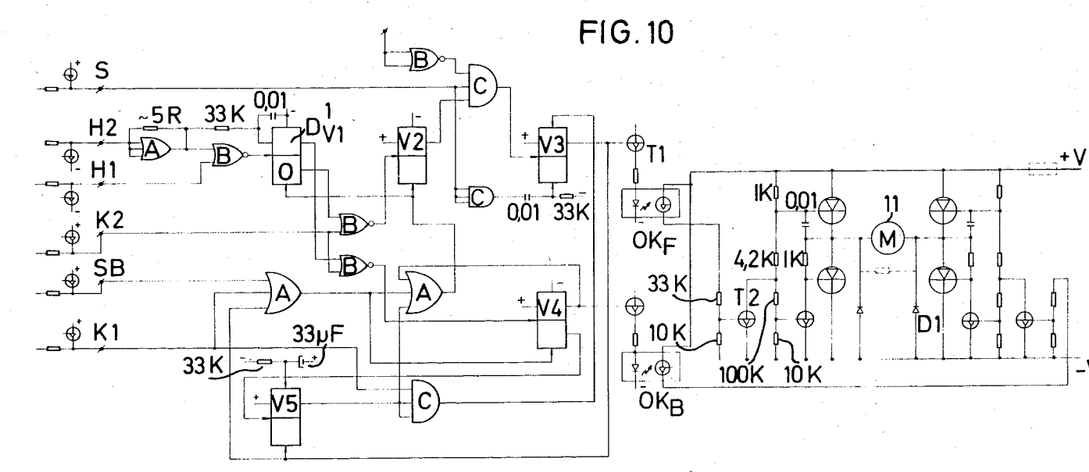
FIG. 10 shows a logic diagram over a motor control circuit.
Figure 11:
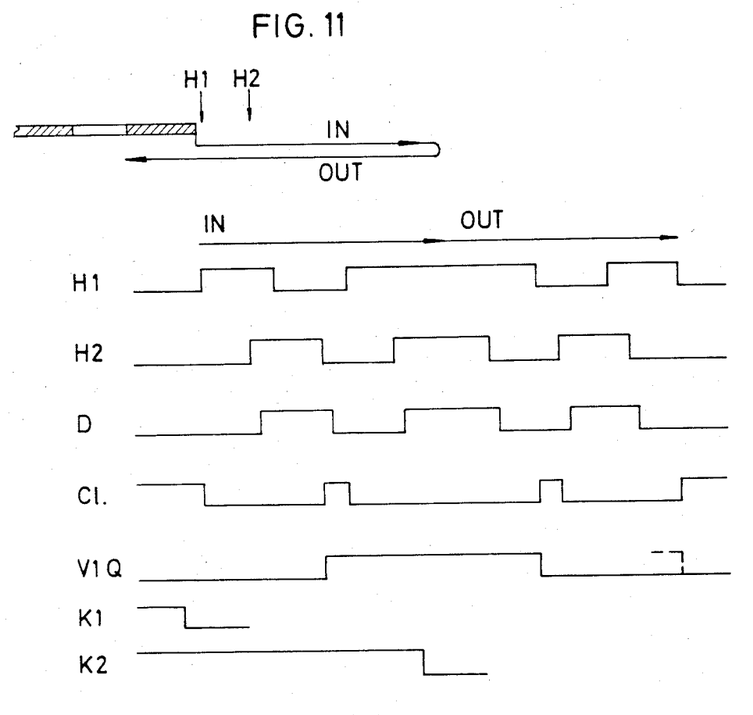
FIG. 11 shows waveforms of the circuit of FIG. 10.

In FIG. 11 are shown some waveforms explaining the circuit of FIG. 10. H1 and H2 are the signals from two hole detectors placed as apparent schematically from FIG. 9, whereas K1 and K2 are edge sensing signals as apparent from FIGS. 8 and 9. When a tag is introduced, H1 first goes high, as the tag blocks the light, and then H2 goes high for the same reason. Then, H1 detects the hole and goes low again, whereafter H2 detects the hole. D is a delayed version of H2, by means of an RC circuit, and which is sent to the D input of "hole memory" V1. The "clock" input of this circuit receives the signal denoted as C1 in FIG. 11. It is noted that circuits V2–V5 have their D inputs positive and are therefore set by their clock input going high.

As shown in FIG. 10, the drive circuit for the motor 11 is activated by means of opto-couplers $OK_F$ (forward movement) and $OK_B$ (backward movement).

Figure 6:
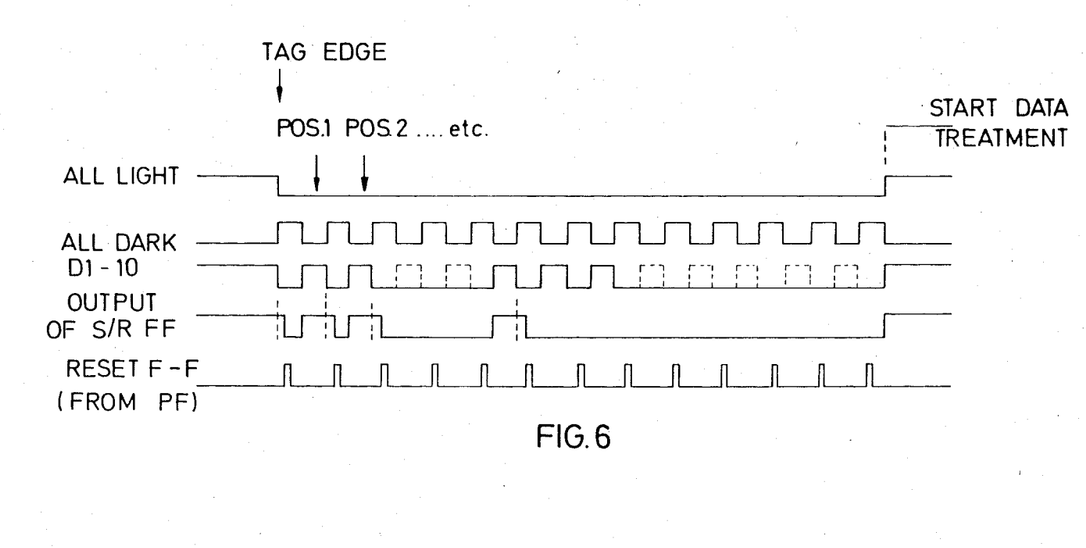
FIG. 6 shows waveforms encountered in tag reading operations.

Sensors FT1–FT10 are coupled to a logic 28 having features which will be described with reference also to FIG. 6.

Logic 28 has one output 29 which signalizes that all photosensors 18 are receiving light. This is normally the case e.g. when no tag has reached reading position. When motor 11 (FIG. 2) starts, the edge of tag 3 will reach the row of sensors 18, and they will all turn "dark". The signal "all light" on output 29 will go low, and logic operation will start. Reading phase will end when tag has passed beyond sensors 18 and "all light" on output 29 goes high.

On output 30 of logic 28, there is sensed a signal "all dark", which goes high when all the sensors 18 sense low light intensity. When a code hole comes before one of the sensors, this signal goes low.

It may be explained here that the Kimball type code is constructed such that a group of five hole positions comprise a cipher position and that all numbers 0–9 correspond to a pair of holes $$\binom{(2)}{(5)} = 10 \ .$$

Thus, any correct cipher position will show exactly two holes. At Position 1, signal "all dark" will thus go low as apparent in FIG. 6. Then, all will go dark until Position 2 is reached, etc.

Each of the ten signals from sensors 18 is coupled to an entry on logic 28, and there are ten outputs on logic 28, indicated as D1–D10. (Logic 28 thereby also works as an interface to following circuits, which are C-MOS.) Those outputs are individually high when a corresponding hole code is present. They are all coupled to parallel inputs on a shift register S/R FF.

As apparent from FIG. 3, SR-FF ("set-reset flip-flop") has ten parallel inputs, ten parallel outputs and a reset input R. A pulse to reset input R will reset all the flip-flops. If one of the signals D1–D10 is high, its corresponding flip-flop will switch, making its corresponding output high permanently, until the circuit is reset by input R. In the preferred embodiment, this circuit SR-FF is a C-MOS circuit known as 4043 (available from several manufacturers). It is noted that this particular "latch circuit" does not use any strobe input, which is an advantageous feature as the positions on a tag may be ill defined, so that a strobed latching would be difficult to time adequately in view of poor precision of location and various defects encountered in tags.

Figure 4:
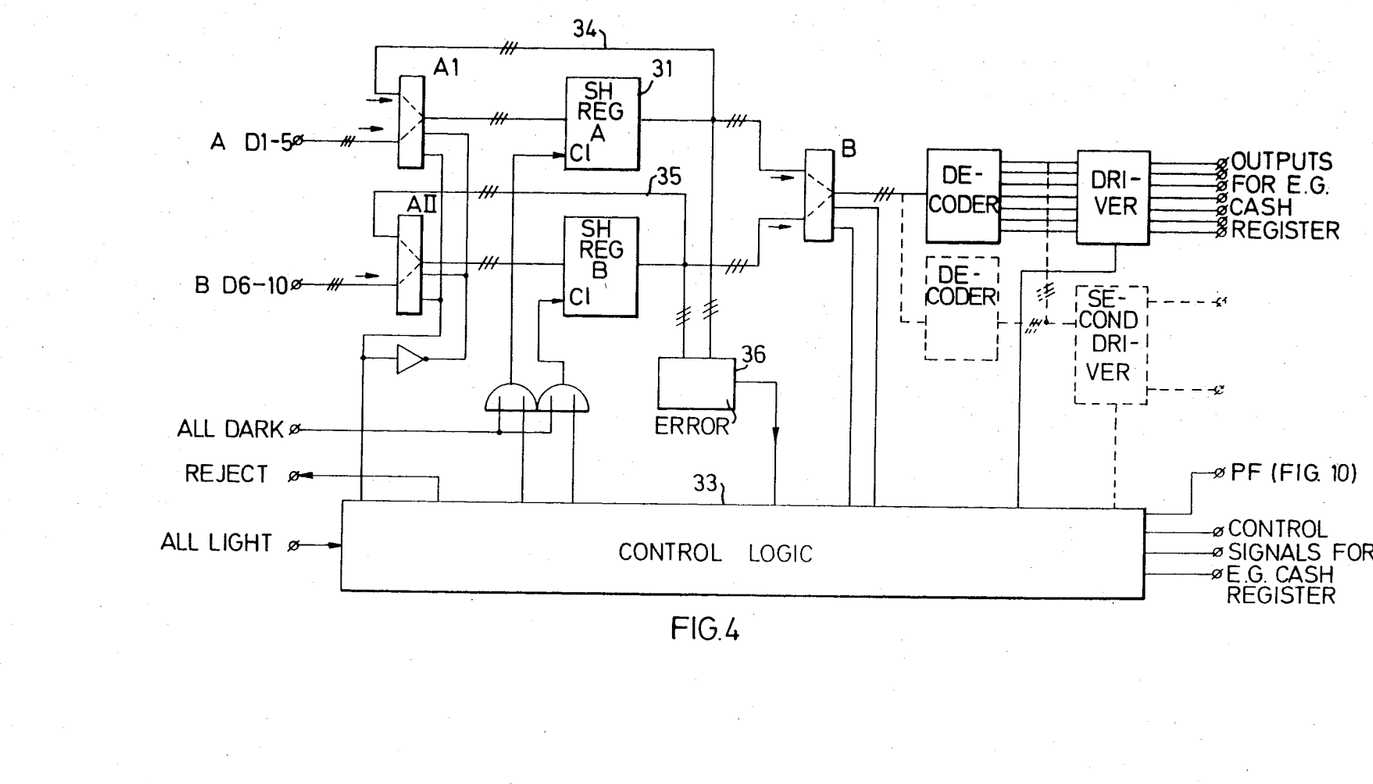
FIG. 4 is an exemplary logic circuit for treating signals from the circuits of FIG. 2.

The signal outputs D1–D10 from S/R FF are clocked into inputs shown in FIG. 4 by means of pulses "all dark". When the first "all dark" comes, meaning that the edge of a tag 3 has been inserted and obstructs all the sensors 18, the first strobing of the circuit in FIG. 3 will transfer all outputs D1–D10 as active, as the sensors were previously all lit.

The "all dark" signal is led to a circuit PF which creates a reset signal with a slight delay, which then resets all the flip-flops in S/R FF. They thus start in "dark" conditions. As soon as one or more of inputs D1–D10 goes high, indicating hole codes, signal "all dark" on head 30 will go low. We are then at Pos. 1 in FIG. 6. A corresponding flip-flop will give a high output in S/R FF. At the end of Pos. 1 in FIG. 1, the "all dark" signal will go high again, as there are no holes in front of sensors 18. The same "all dark" signal will clock in the prevailing contents of S/R FF to the circuit of FIG. 4, and circuit PF will anew reset the flip-flops at R. This is proceeded with row by row, until the tag ends and signal "all light" goes high, as the opposite edge of tag 3 has passed sensors 18.

As has now been explained, there are fed from S/R FF in FIG. 3 a succession of parallel output signals consisting of first ten alike parallel ones and then twelve successive code sets. These are led into bus switches AI and AII (FIG. 4), five into each and switched into shift registers 31 and 32 on a parallel bus input, and clocked in by signal "all dark". There are 12×10 positions all together in the shift registers, and when all twelve bits have been entered into each individual input, the first bit entered will have vanished. In case there is a defective reading such that less than twelve parallel codes have been entered, the first inputs will still remain in the shift registers 31 and 32, and the utility of this for error sensing will be explained below.

When signal "all light" goes high again, a data treatment phase starts under control of logic 33. Switches AI and AII are set such that outputs from registers 31 and 32 are led in a circular path by buses 34 and 35. The shift registers 31 and 32 are clocked by clock signals from the logic 33, and the successive outputs are led to an error detector 36. This error detector for each parallel half corresponding to D1–5 and D6–10 respectively are controlled for the existence in each of exactly two active outputs and three inactive outputs. In case there are more or less, an error signal is generated, and the reading is rejected. If no error is found, a new set of twelve clock pulses is emitted, this time for reading-out purposes.

The codes are thereby led to a decade coder which transfers the Kimball codes into a suitable form for a writer, cash register, a computer and/or some registering medium.

It is again noted that if there have been read less than twelve rows of Kimball codes, the first bits read in, all active, will remain in the shift register and will be detected as an erroneous code in error detector 36.

It is noted that it is preferred to let motor 11 of FIG. 2 work in a step-wise way, e.g. by using a step motor, and stop the motor 11 in a position where a tag has been read but remains between pinwheel 10 and guides 12 and 13. It is then possible to hold a passed tag until the data have been treated and no fault has been found. Only then will the motor 11 be allowed to start again in order to let the tag fall into box 8′. In case the error detector 36 activates, motor 15 is activated to swing the switch 14 so that the erroneously read tag goes to exit 5, for making another attempt at reading or for manual handling.

In FIG. 4, there are shown terminals of logic 33 which are used for control signals. In the embodiment as shown in FIG. 1, the cash register will take in prices figure by figure as an ordinary adding machine. When all the figures of a price have been entered, logic 33 sends a sum signal to the cash register, which will then automatically make the operations previously described. In other types of data collectors, other kinds of control signals are used, for instance strobe signals, and there may be an acknowledge signal indicating that a new figure may be fed. The various modifications necessary for such use are known in the art.

Figure 5:
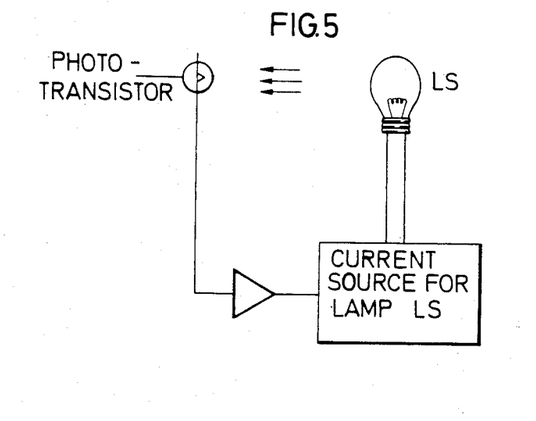
FIG. 5 shows a circuit for adjusting illumination of a tag depending on its type.

According to a preferred embodiment, the same code reader may also be used for printed codes instead of hole codes. This may be obtained by means of letting a phototransistor sensor sense light through the tag at a row position where there are no holes or printed signs. This sensor is coupled to control the light source LS such that it will set to about half maximum light output when light attenuated by tag is sensed by the sensor. This may be e.g. sensor 25 or 26 of FIG. 3, and a circuit therefor is shown in FIG. 5. When a hole passes one of phototransistors FT 1-10, or there is no tag, those sensors will go low, and if a printed spot is found in a "hole position", the respective phototransistor will go high. The outputs are sensed by window discriminators in logic 28, which give out passive data levels around a mean light level but will give active data levels for either high or low phototransistor voltage on sensors F1–F10. Thus, it is possible with one and the same electronics to sense hole codes and "black points" codes.

Figure 7:
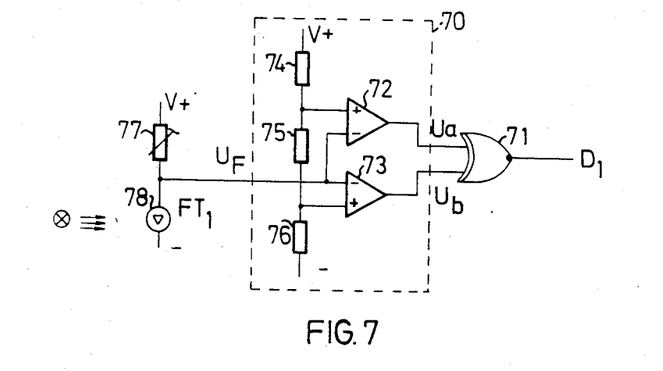
FIG. 7 shows a circuit for sensing a phototransistor.

As explained with reference to FIG. 5, the light intensity from lamp LS is governed by a feedback loop. In the preferred embodiment for sensing dots or holes, there is for each of channels D1–D10 a special circuit. An exemplary circuit is shown in FIG. 7, being mounted for channel D1. When in function, lamp LS is controlled so that when a tag portion free of hole or dot is in front of phototransistor FT1 (78), its output signal is roughly half the voltage available, i.e. about $V_+/2$. The signal from 78 is led to a window discriminator 70. In this circuit 70, there are two comparator circuits 72 and 73, the positive inputs of which are biased by means of a resistor chain 74–76 such that they receive about $2V_+/3$ and $V_+/3$ respectively. If now the quiescent voltage at about $V_+/2$ prevails as input signal $V_F$, comparator 72 will give a high output signal and comparator 73 a low output signal. These output signals $V_a$ and $V_b$ are led to an EXCLUSIVE NOR/gate 71 and the result will be a low output D1. If signal $V_F$ goes below $V_+/3$ or goes higher than $2V_+/3$, indicating a printed dot or a hole respectively, gate 71 will in both cases deliver a high output signal D1. Signals D1–D10 are then treated as explained for the case with holes only.

With this embodiment, which is preferred at the moment, it is possible to arrange in an extremely simple way for marking down of prices. Such marking-down is habitually done for various reasons, as for example when an article is no longer available in all sizes or when there is an annual sale. Sometimes, a product may have become shop-worn and cannot be sold at the originally intended price. In all such cases, a sticker 50 (see FIG. 3) is affixed to the tag in a position near the legible price 51. The sticker is provided with a border which is e.g. as wide as two code holes. A discriminator 53 is activated from a reading sensor 52, functioning the same way as sensors 18, and will give off a signal when finding such a border. This signal is used as a reject signal, and the tag will be rejected, unless the changed price was introduced on the keyboard before the tag was put in.

Sometimes, price tags are used which have a price 00.00 inscribed in the price code. The idea is to provide the price at a later stage, although keeping the other information available for registering. Thus, the price is marked only in eye-legible form. In such a case, it is necessary to introduce a zero-price finding effect. This is done by providing the control logic with a watch function which is set to zero when reading is commenced and which is set as soon as a figure of 1–9 is read but stays unset if there are only zeroes read. If thus, the price is read as zero, the tag is rejected unless a price is introduced by hand at the keyboard.

The electronic circuits now described in a preferred embodiment build on a logic unit 33 which may be the "Motorola Industrial Control Unit MC 14500B". Since so such detail is described therein, the "Motorola Handbook" for this one-bit computer, printed in 1977, is hereby included by reference in the present description. The ROM for the program used should be programmed according to the use described, a task well within reach for an average electronician, as is the choice of the other hardware shown and described.

What I claim is:

1. A tag reader for registering on an electronic sales register the price of merchandise at point of sale comprising:
   a tag reader for converting optically encoded pricing data to electronic data signals including:
   a housing including a slot aperture for receiving said tag;

a tag presence detecting means for detecting the presence of said tag in said slot;

a tag feeding means connected to receive and advance said tag from said slot to a tag reading station;

bifurcation means connected to receive said tag from said reading station, said bifurcation means including first and second tag delivering paths, operable in response to the decoding of data on said tag;

tag reading means for reading optically coded information on said tag, said means including an error detector for checking of errors in read information, means for supplying said read optically coded information to electronic point of sales equipment for display; and means for operating said bifurcation means to deliver said tag to a first of said delivery paths in the absence of an error detection, and to supply said tag to the second of said delivery paths when an error is detected.

2. A tag reader for registering on electronic point of sale equipment sales information for merchandise identified by said tag comprising:

a tag processing path including a tag guiding channel having an entrance for receiving the leading edge of said tag and an exit for delivering said tag;

a rotating drum having a surface adjacent said channel exit for contacting said tag leading edge, said drum including along a surface thereof means for holding said tag;

a curved guide spaced apart from said rotating drum and forming a tag feeding path therewith, whereby tags are forced during rotation of said drum to a tag reading station along said path;

a tag reading station along said path, means for sensing the presence of said tag leading edge at said channel exit, said means providing an enabling signal for rotating said drum for advancing said tag to said tag reading station;

means for reading and validating data on said tag, said means including an error detector for determining when said tag read data is incorrect;

bifurcation means connected to receive said tag from said reading station, and deliver said tag to one of two exit paths for said tag selected in response to said error detector, whereby said tag is directed to a first of said exit paths in the absence of a detected error, and to a second of said exit paths when an error is detected.

3. The tag reader of claim 2 further comprising:

means for detecting the presence of tag orientation indicia on said tag, means connected to said drum for rotating said drum in a direction for advancing said tag to said tag reading station in response to the detection of said orientation indicia, and for rotating said wheel in an opposite direction in the absence of a detection of said orientation indicia whereby said tag is forced in an opposite direction through said guiding channel.

4. In a system for reading optically encoded sales information on tags and displaying said information, a tag reader comprising:

a tag processing path having a receiving end which admits the leading edge of said tag;

a tag edge sensor connected to determine the presence of said edge in said receiving end, said sensor providing an enabling signal when said edge is detected;

an orientation sensor positioned at said receiving end for determining the correct orientation of said tag in said receiving end;

means for advancing said tag along said path to a tag reading station in response to signals from said orientation sensor and said edge detector;

means located at said reading station for converting indicia on said tag to electrical binary signals, said electrical signals containing said information for display;

means for verifying said binary signals for determining whether an error is contained in said electrical signals;

bifurcation path means located along said path for receiving a tag from said tag reading station, said bifurcation path selecting an exit path for said tag in response to a signal from said means for verifying; and means for advancing said tag to said bifurcation means at the conclusion of verifying said binary signals, whereby said tag exits through a path determined by the presence or absence of an error detected in said information.

5. In a system for optically reading sales information from tags, and presenting said information from said tags for display, an apparatus for processing said tags comprising:

a tag receiving channel which receives a leading edge of said tag at an inlet;

a rotatable drum member located at an outlet channel of said receiving channel, said drum member including along a periphery thereof a projection for abutting said leading edge, said drum including an indicia for indicating a first home position of said drum, and a tag rejection position of said drum;

an edge sensor for detecting the presence of said tag in said channel;

means for sensing said drum positions indicia, orientation sensor means for sensing a correct orientation of said tag, said sensor providing a signal indicating said correct orientation;

means for rotating said drum in a first direction in response to a signal from said edge sensor and said orientation sensor for transferring said tag to a tag reading station, and for rotating said drum in a reverse direction in response to the presence of a signal from said edge sensor and an indication from said orientation sensor that said tag is incorrectly inserted, whereby said tag is displaced rearwards in said receiving channel for removal of said tag; and means for rotating said drum to said home position in response to a simultaneous indication from said edge sensor that said tag is removed, and from said means for sensing said drum position, whereby said drum is set to receive a subsequently inserted tag.

6. In a system for optically reading tags bearing price indicia, and recording during the sale of merchandise indicated prices, said tag including orientation indicia, an apparatus for forwarding a correctly inserted tag to a station for reading said price indicia, and for rejecting an incorrectly inserted tag comprising:

a channel for receiving said tag;

a direction reversible rotatable drum positioned at an exit end of said channel, rotatable between a first tag receiving position and a second tag rejecting position, said drum including along its periphery a projection abutting an edge of said tag, said drum including position indicia optically sensed determining whether said drum is in a tag receiving position or a tag rejecting position;

means for sensing the positions of said rotatable drum indicia for producing first and second signals when said drum is in said receiving and rejecting positions respectively;

means for sensing the presence of said tag in said channel and producing a tag presence indicating signal;

means for detecting said orientation indicia on said tag and producing third and fourth signals indicating a correct, and incorrect respectively, tag orientation in said channel;

means for rotating said drum in a direction to transfer said tag to said station for reading said price indicia in response to a combination of signals including said tag presence signal, said third orientation indicia signal and said first drum position signal;

means for rotating said drum in a direction to force said tag out of said channel in response to the combination of said tag presence indicating signal and said tag orientation fourth signal; and means for rotating said drum to said tag receiving position in response to the combination of an absence of said tag presence indicating signal and said drum position second signal whereby said drum upon removal of a rejected tag returns to said tag receiving position.

7. The apparatus of claim 4, wherein later added cancellation indicia to said tag obstructs the reading of said tag indicia;

said means for verifying providing a signal indicating an error is contained in said electrical binary signals, and said tag exits through one of said paths of said bifurcation path means selected by an error detector.

* * * * *